US010853924B2

(12) United States Patent
Nicholson et al.

(10) Patent No.: US 10,853,924 B2
(45) Date of Patent: Dec. 1, 2020

(54) OFFSET CAMERA LENS

(71) Applicant: Lenovo (Singapore) Pte. Ltd., Singapore (SG)

(72) Inventors: John Weldon Nicholson, Cary, NC (US); Howard Locker, Cary, NC (US); Daryl Cromer, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/368,357

(22) Filed: Mar. 28, 2019

(65) Prior Publication Data

US 2020/0311885 A1 Oct. 1, 2020

(51) Int. Cl.
*G06T 5/00* (2006.01)
*H04N 5/225* (2006.01)
*G06F 1/16* (2006.01)

(52) U.S. Cl.
CPC ........... *G06T 5/006* (2013.01); *H04N 5/2254* (2013.01); *G06F 1/1686* (2013.01)

(58) Field of Classification Search
CPC .............................. H04N 5/2254; G06T 5/006
See application file for complete search history.

(56) References Cited

U.S. PATENT DOCUMENTS

| 2008/0218607 | A1* | 9/2008 | Shoji ...................... H04N 5/217 348/241 |
| 2016/0269629 | A1* | 9/2016 | Martin ............... H04N 5/23238 |
| 2019/0212788 | A1* | 7/2019 | Kwak ................... G06F 1/1686 |

* cited by examiner

*Primary Examiner* — Christopher K Peterson
(74) *Attorney, Agent, or Firm* — Ference & Associates LLC

(57) ABSTRACT

One embodiment provides a method, including: capturing, using a camera sensor integrated into an information handling device, image data; identifying, using a processor, an offset between a lens operatively coupled to the camera sensor and a central portion of the camera sensor; and correcting, based on the offset, a distortion of the image data. Other aspects are described and claimed.

20 Claims, 6 Drawing Sheets

PRIOR ART

OFFSET CAMERA LENS

BACKGROUND

There has been an increasing trend toward narrower bezels on information handling devices ("devices"), for example smart phones, tablet devices, laptop and personal computers, and the like. With this trend, device designers are creating new ways in which various hardware components of the device (e.g., light sensors, front-facing camera sensors, etc.) may be re-organized in order to maximize a surface area of the device's display screen.

BRIEF SUMMARY

In summary, one aspect provides a method, comprising: capturing, using a camera sensor integrated into an information handling device, image data; identifying, using a processor, an offset between a lens operatively coupled to the camera sensor and a central portion of the camera sensor; and correcting, based on the offset, a distortion of the image data.

Another aspect provides an information handling device, comprising: a camera sensor; a lens operatively coupled to the camera sensor; a memory device that stores instructions executable by the processor to: capture image data; identify an offset between the lens and a central portion of the camera sensor; and correct, based on the identifying, a distortion of the image data resulting from the offset.

A further aspect provides a product, comprising: a storage device that stores code, the code being executable by a processor and comprising: code that captures image data at a camera sensor; code that identifies an offset between a lens operatively coupled to the camera sensor and a central portion of the camera sensor; and code that corrects, based on the identifying, a distortion of the image data resulting from the offset.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As technology advances, bezels of display devices continue to become thinner. A natural result of this trend is that the area of a display portion increases, which allows a user to visualize more content on a single screen and allows a larger screen to be packaged in the same sized device. However, the small size of these modern bezels has made it challenging to include various sensors conventionally embedded in the bezel (e.g., light sensors, front-facing camera sensors, etc.). A conventional resolution to this issue has been to extend a small portion of the bezel (e.g., a middle portion of the top bezel, etc.) into the active area of the display screen. This expanded bezel portion has become known as a "notch" and generally contains one or more of the foregoing sensors.

Figure 6:
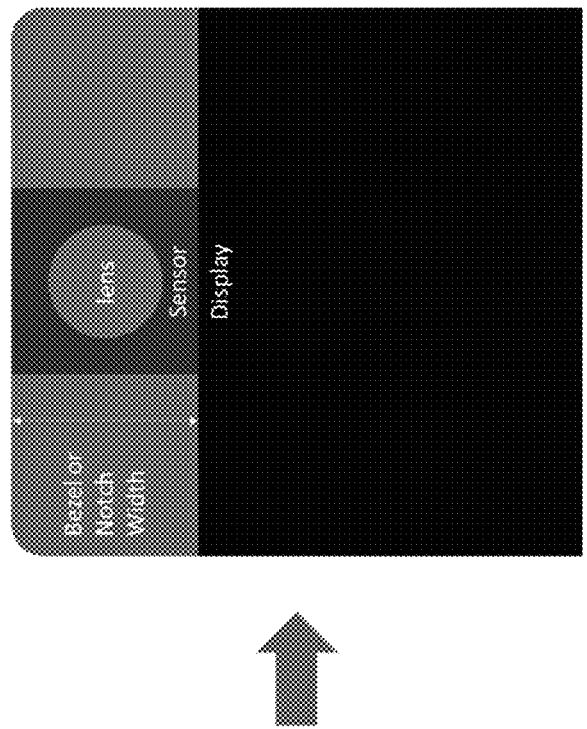
FIG. 6 illustrates a prior art configuration of a camera lens with respect to a camera sensor.
Figure 6:
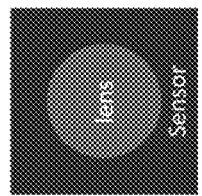

Although a notch may allow the areas of the display screen immediately adjacent to the notch to be expanded upwards, there are still limitations on how thin the notch may actually become. More particularly, and with reference to FIG. 6, conventional implementations of front-facing cameras are designed so that the bezel width is large enough that it covers at least an entirety of a camera sensor. Additionally, conventional camera configurations have the camera lens positioned substantially over the center of the camera sensor. Although the camera sensor may be positioned underneath the display screen, the camera lens cannot. Therefore, the display screen can only be extended up to the bottom portion of the centrally positioned camera lens.

Accordingly, an embodiment provides a camera module configuration in which the lens is offset from a central portion of the camera sensor. In an embodiment, image data may be captured using a camera of a device. The camera may have the camera lens offset from a central portion of the camera sensor by a particular amount in the X direction and/or the Y direction. Responsive to identifying the amount of offset, an embodiment may dynamically correct any distortion to the image arising from the offset camera lens. Such a configuration and method may dramatically reduce the width of a device's bezel.

The illustrated example embodiments will be best understood by reference to the figures. The following description is intended only by way of example, and simply illustrates certain example embodiments.

Figure 1:
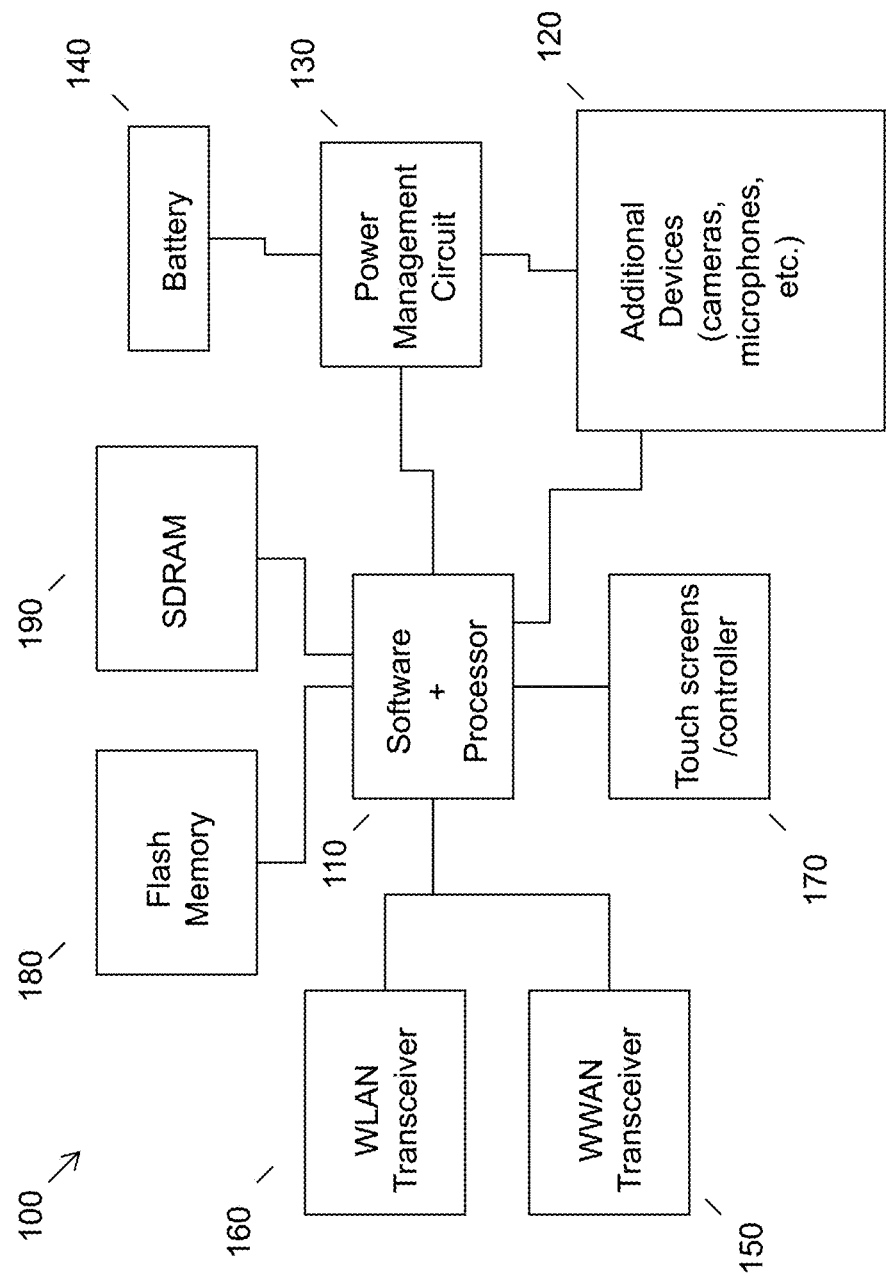
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a worldview or front-facing camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
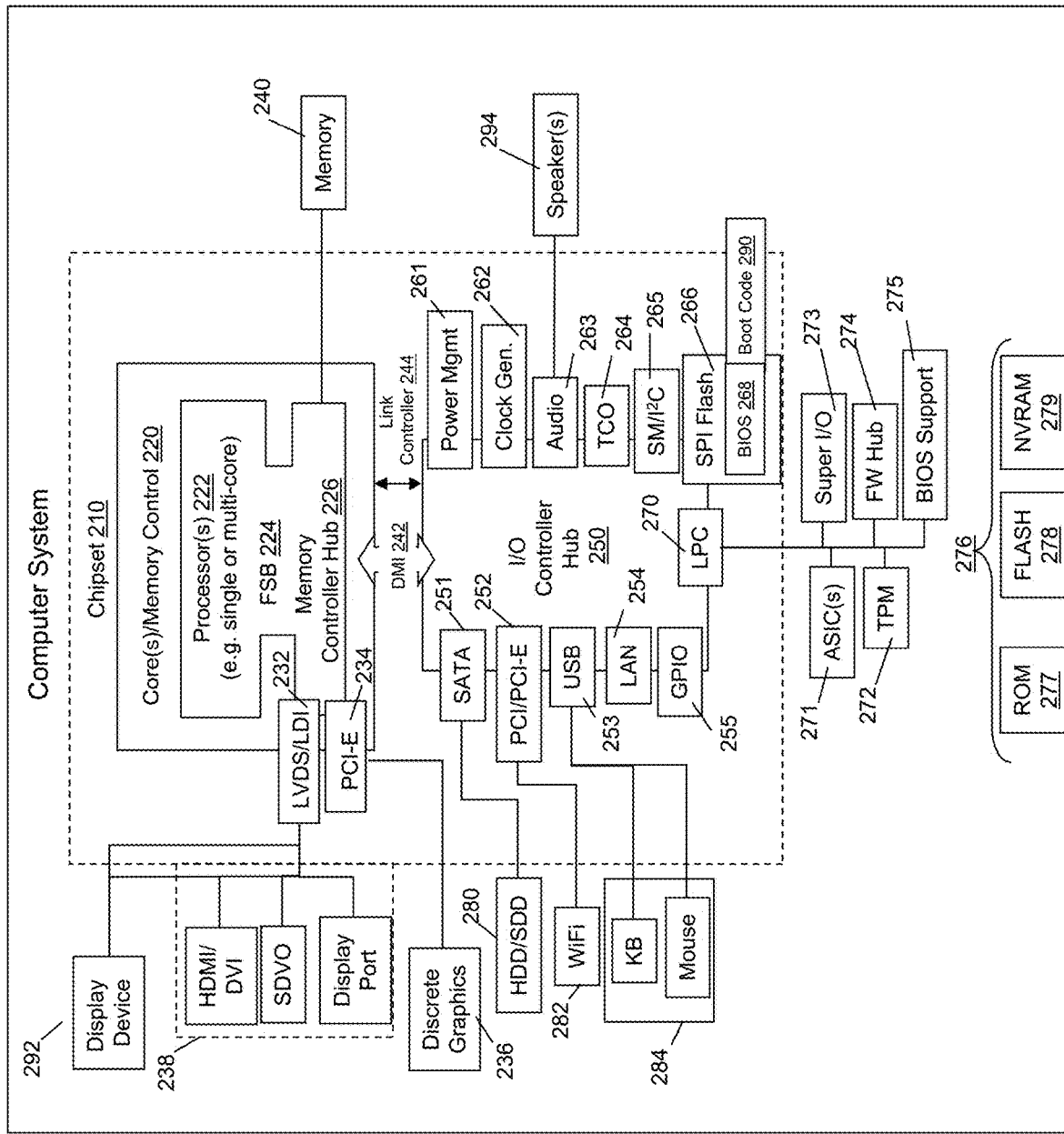
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, personal and/or laptop computer devices generally, and other electronic devices that comprise a front-facing camera positioned in a portion of the bezel. For example, the circuitry outlined in FIG. 1 may be implemented in a tablet or smart phone embodiment, whereas the circuitry outlined in FIG. 2 may be implemented in a laptop.

Figure 3:
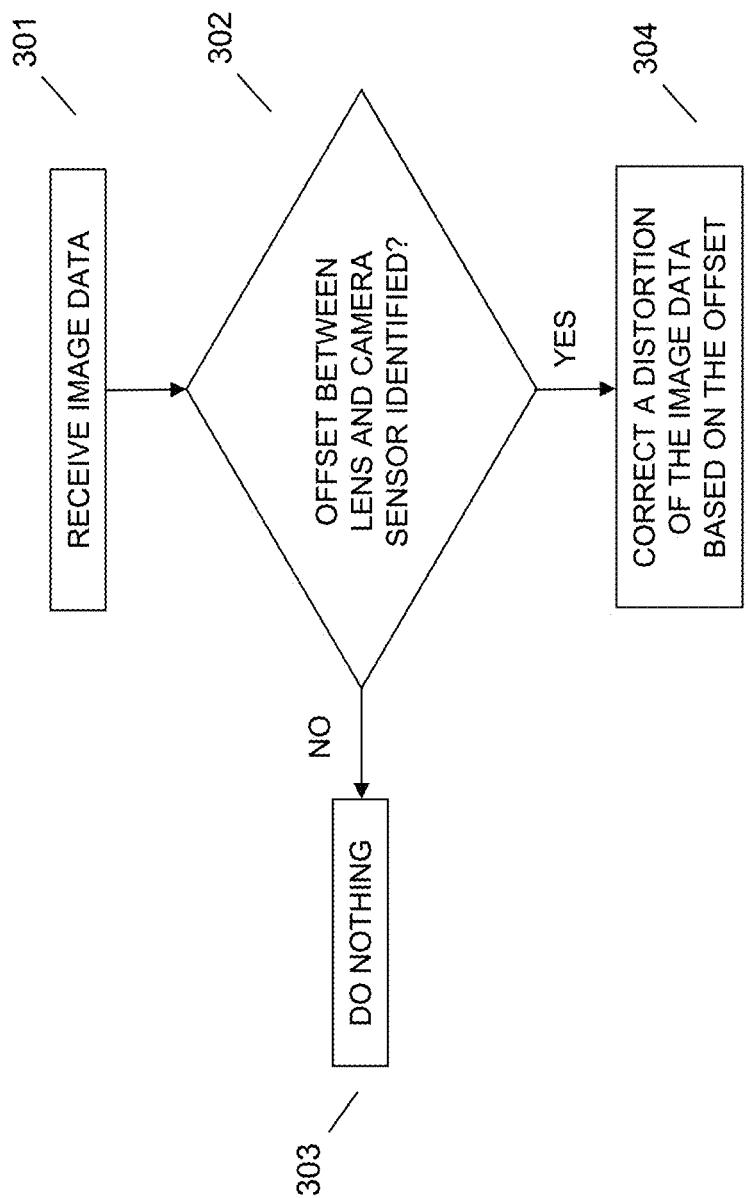
FIG. 3 illustrates an example method of correct a distortion of an offset camera lens.

Referring now to FIG. 3, an embodiment may automatically correct a distorted image produced by an offset camera lens. At 301, an embodiment may receive image data at a camera. In an embodiment, the camera may be an always-on camera that captures image data continuously or, alternatively, may only activate and capture image data responsive to receiving a user command to capture (e.g., interaction with a capture button, etc.).

Figure 4A:
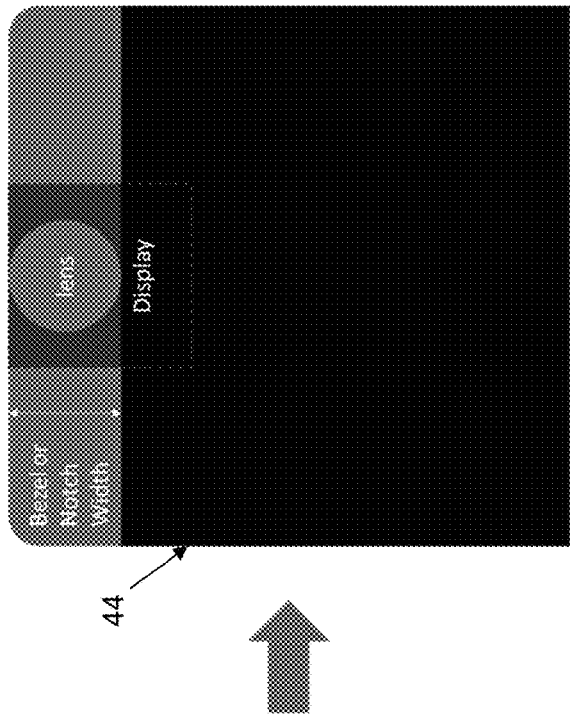
FIG. 4(A-B) provides an example illustration of an offset camera lens according to the embodiments.
Figure 4A:
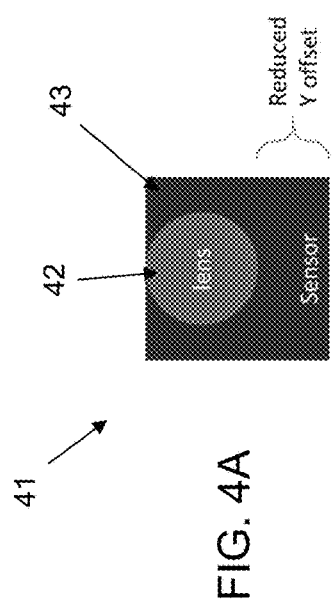
Figure 4B:
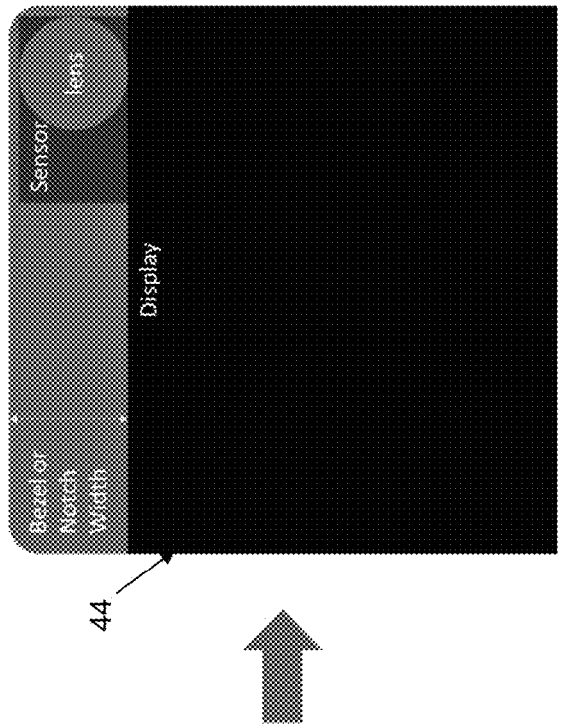
Figure 4B:
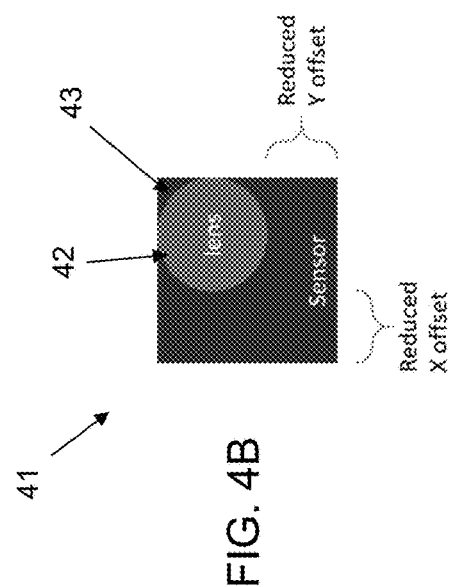

In an embodiment, a lens of the camera may be offset from a central portion of the camera sensor by a predetermined amount. In an embodiment, the camera lens may be offset from the central portion in an x-direction, a y-direction, or both. As an example of the foregoing and with reference to FIG. 4A, an embodiment illustrates a camera module 41 comprising a camera lens 42 offset from a central portion of a camera sensor 43 in a y-direction. This offset configuration may allow the camera lens 42 to be positioned at the top portion of the sensor 43, which may correspondingly allow a display screen 44 to be extended up further (i.e., to a bottom portion of the offset lens) than conventional configurations. As another example and with reference to FIG. 4B, an embodiment illustrates a camera module 41 comprising a camera lens 42 offset from a central portion of a camera sensor 43 in both an x-direction and a y-direction. This offset configuration may allow the camera lens 42 to be positioned at a corner portion of the sensor 43, which, in addition to allowing for the extension of the device's display screen 44, may also introduce flexibility into potential design configurations for the device.

Figure 5B:
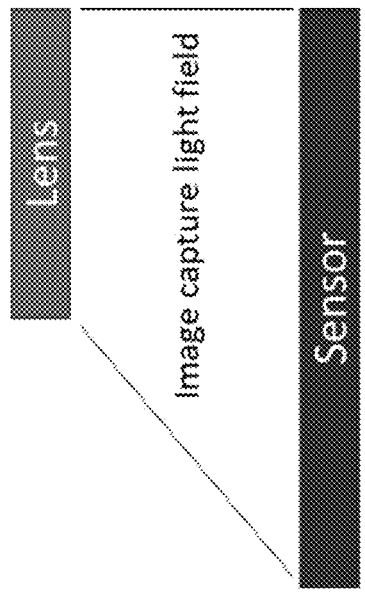
FIG. 5(A-B) illustrates an example illustration of an offset camera lens with respect to a camera sensor.
Figure 5A:
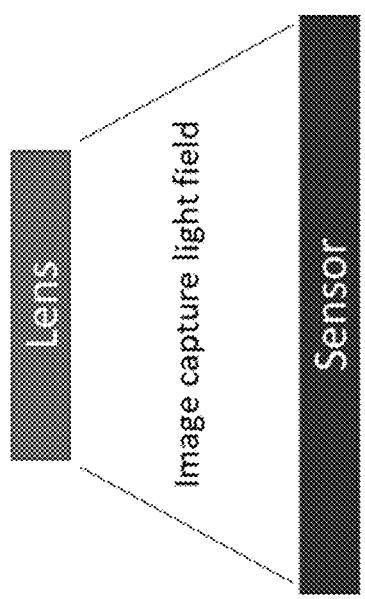

The resulting effect of this offset configuration is that captured images will be distorted. For example, with reference to FIG. 5A, a conventional camera module is illustrated where a camera lens is positioned substantially over top of the camera sensor. This configuration allows captured light to fall in equal proportions across the sensor region. However, when the camera lens is offset from the sensor center, as illustrated in FIG. 5B, the captured light falls in unequal proportions across the sensor region, thereby distorting the image. Accordingly, additional, post processing steps need to be taken to correct for this distortion, which are further described herein.

At 302, an embodiment may identify a value of the offset between the camera lens and the camera sensor. The identification may be conducted by referring to a data store comprising known values of the offset in each embodiment. More particularly, the data store may comprise information associated with the type of offset (e.g., x-direction offset, y-direction offset, both, etc.) and the degree of the offset. Additionally, the data store may comprise information associated with the dimensions of the lens and sensor as well as the spacing between these two components. All of the foregoing information may be provided to the data store at the time of manufacture of the device and may thereafter be accessed by the device when needed. In an embodiment, the database may be stored locally, on the device, or may be stored at a remote storage location (e.g., on another device or server, etc.) and may be accessible by the device via a wired or wireless connection.

Responsive to not identifying, at 302, the value of the offset, an embodiment may, at 303, take no additional action. Additionally or alternatively, an embodiment may provide a notification to a user that a value of the offset could not be identified. Conversely, responsive to identifying, at 302, the value of the offset, an embodiment may, at 304, correct any resultant distortion of the image arising from the offset.

In an embodiment, the correction may be facilitated by using a math transformation comprising the value(s) associated with the offset as well as the dimensions and spacing of the camera sensor and the camera lens. The transformation may account for the offset of the lens and produce an image that would have been captured if the lens was in the conventional position (i.e., above the center of the camera sensor). In an embodiment, the correction may occur automatically on the device without additional user input. Additionally the correction may occur prior to presentation of the image to a user. Accordingly, the user is always presented with the corrected image and never needs to see the distortion.

The various embodiments described herein thus represent a technical improvement to conventional camera configurations and image capturing techniques. Using the techniques described herein, an embodiment may capture image data using a camera of a device. The camera may comprise an asymmetrically offset lens positioned over top a camera sensor. The offset configuration may allow a display screen of a device to be extended up, over top of a portion of the sensor, to a bottom portion of the lens. An embodiment may correct a resulting distortion of the image created by the offset by utilizing at least the information of the offset in a math transformation to remove the distortion. Such a method may allow a surface area of a display screen of a device to be increased while not sacrificing image capture quality.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
capturing, using a front-facing camera sensor integrated into an information handling device, image data, wherein the camera sensor is at least partially covered by a display screen of the information handling device;
identifying, using a processor, an offset between a lens operatively coupled to the camera sensor and a central portion of the camera sensor, wherein the display screen does not cover the lens; and
correcting, based on the offset, a distortion of the image data.

2. The method of claim 1, wherein the offset comprise an x-direction offset from the central portion of the camera sensor.

3. The method of claim 1, wherein the offset comprise a y-direction offset from the central portion of the camera sensor.

4. The method of claim 3, wherein the y-direction offset corresponds to a top placement of the lens over the camera sensor.

5. The method of claim 1, wherein the offset comprises an x-direction offset and a y-direction offset from the central portion of the camera sensor.

6. The method of claim 5, wherein the x-direction offset and the y-direction offset correspond to a corner placement of the lens over the camera sensor.

7. The method of claim 1, wherein the information handling device comprises a display unit positioned over a portion of the camera sensor.

8. The method of claim 7, wherein a top of the display unit terminates at a bottom end of the lens.

9. The method of claim 1, wherein the correcting the distortion comprises automatically correcting the distortion utilizing dimensional data of the lens and the camera sensor in correspondence with the identified offset.

10. The method of claim 1, wherein the correcting comprises correcting the image data prior to displaying the image data.

11. An information handling device, comprising:
a front-facing camera sensor;
a lens operatively coupled to the camera sensor;
a memory device that stores instructions executable by the processor to:
capture image data, wherein the camera sensor is at least partially covered by a display screen of the information handling device;
identify an offset between the lens and a central portion of the camera sensor wherein the display screen does not cover the lens; and
correct, based on the identifying, a distortion of the image data resulting from the offset.

12. The information handling device of claim 11, wherein the offset comprises an x-direction offset from the central portion of the camera sensor.

13. The information handling device of claim 11, wherein the offset comprises a y-direction offset from the central portion of the camera sensor.

14. The information handling device of claim 13, wherein the y-direction offset corresponds to a top placement of the lens over the camera sensor.

15. The information handling device of claim 11, wherein the offset comprises an x-direction offset and a y-direction offset from the central portion of the camera sensor.

16. The information handling device of claim 15, wherein the x-direction offset and the y-direction offset correspond to a corner placement of the lens over the camera sensor.

17. The information handling device of claim 11, wherein the information handling device comprises a display unit positioned over a portion of the camera sensor.

18. The information handling device of 17, wherein a top of the display unit terminates at a bottom end of the lens.

19. The information handling device of claim 11, wherein the instructions executable by the processor to correct the distortion comprise instructions executable by the processor to automatically correct the distortion utilizing dimensional data of the lens and the camera sensor in corresponded with the identified offset.

20. A product, comprising:
a non-transitory storage device that stores code, the code being executable by a processor and comprising:
code that captures image data at a front-facing camera sensor, wherein the camera sensor is at least partially covered by a display screen of the information handling device;
code that identifies an offset between a lens operatively coupled to the camera sensor and a central portion of the camera sensor, wherein the display screen does not cover the lens; and
code that corrects, based on the identifying, a distortion of the image data resulting from the offset.

* * * * *